(12) United States Patent
Mashkevich et al.

(10) Patent No.: US 7,296,490 B2
(45) Date of Patent: Nov. 20, 2007

(54) SWITCH ASSEMBLY FOR SELECTING AMONG PLURALITY OF SHIFT SCHEDULES ON AN ELECTRONICALLY CONTROLLED TRANSMISSION

(75) Inventors: Michael Mashkevich, West Bloomfield, MI (US); Jeffrey C Hendry, Waterford, MI (US); Laura Porrone, Sterling Heights, MI (US)

(73) Assignee: Chrysler LLC, Auburn Hills, MI (US)

( * ) Notice: Subject to any disclaimer, the term of this patent is extended or adjusted under 35 U.S.C. 154(b) by 225 days.

(21) Appl. No.: 11/021,578

(22) Filed: Dec. 23, 2004

(65) Prior Publication Data
US 2006/0142116 A1    Jun. 29, 2006

(51) Int. Cl.
*F16H 59/00*    (2006.01)
(52) U.S. Cl. ........................... 74/335; 74/473.3

(58) Field of Classification Search ............. 74/335, 74/473.3; 200/61.91, 553
See application file for complete search history.

(56) References Cited

U.S. PATENT DOCUMENTS

| | | | | |
|---|---|---|---|---|
| 3,674,953 A | * | 7/1972 | Brevick | 200/548 |
| 6,105,453 A | * | 8/2000 | Ooyama et al. | 74/473.3 |
| 6,295,887 B1 | * | 10/2001 | DeJonge et al. | 74/473.3 |
| 6,564,661 B2 | * | 5/2003 | DeJonge | 74/335 |

* cited by examiner

Primary Examiner—Ha D. Ho
(74) Attorney, Agent, or Firm—Ralph E. Smith

(57) ABSTRACT

An electrical switch assembly is provided for an electronically controlled transmission that allows user selection between a plurality of shift schedules for the transmission. The switch assembly provides a signal for selecting among the plurality of shift schedules and has a housing. A first set of electrical contacts are positioned within the housing, and selectively closable to cause the input signal to be indicative of a selection of a first shift schedule. A second set of electrical contacts are positioned within the housing and are selectively closable to cause input signal to be indicative of a selection of a second shift schedule.

9 Claims, 2 Drawing Sheets

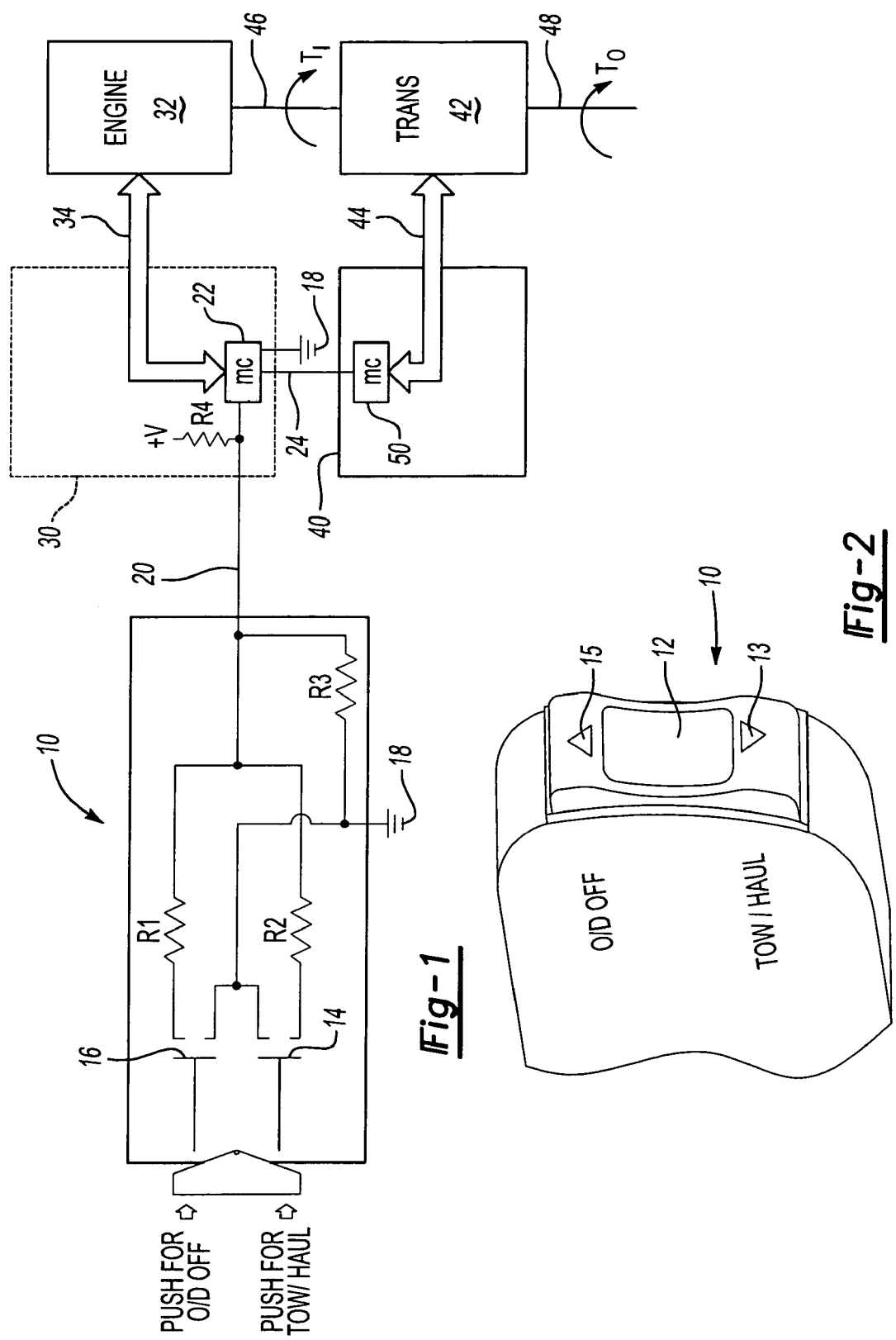

SWITCH ASSEMBLY FOR SELECTING AMONG PLURALITY OF SHIFT SCHEDULES ON AN ELECTRONICALLY CONTROLLED TRANSMISSION

FIELD OF THE INVENTION

The present invention relates to electronically controlled transmissions having a plurality of shift schedules, and more particularly to a device for selecting from the shift schedules.

BACKGROUND OF THE INVENTION

In the field of automotive design, electronically powered transmissions having a plurality of shift schedules are controlled by switch assemblies receiving input from the vehicle operator regarding the desired shift schedule engagement. For example, a vehicle can be provided with separately located switch assemblies for selecting a tow/haul modified shift schedule, and an overdrive shift schedule in the transmission control module. Such separately located switch assemblies are ergonomically less desirable and increase the quantity of electrical wire needed for communicating with the transmission controller.

Therefore, there exists a need in the art to provide a switch assembly that reduces the quantity of wire needed for communication between the switches and the transmission control module and improves ergonomics over known arrangements.

SUMMARY OF THE INVENTION

In accordance with the needs identified above, an electrical switch assembly is provided for an electronically controlled transmission having a transmission controller arranged to provide a plurality of shift schedules for the transmission. The switch assembly provides a signal for selecting among the plurality of shift schedules and has a housing. A first set of electrical contacts are positioned within the housing, and selectively closable by operation of an input member to cause the input signal to be indicative of a selection of a first shift schedule. A second set of electrical contacts are positioned within the housing and are selectively closable by operation of the input member to cause the input signal to be indicative of a selection of a second shift schedule.

Other objects, features and advantages of the present invention will become apparent from the detailed description of the presently preferred embodiments when read in conjunction with the accompanying drawings. The detailed description and drawings, while indicating the preferred embodiment of the invention, are intended for purposes of illustration only and are not intended to limit the scope of the invention.

BRIEF DESCRIPTION OF THE DRAWINGS

FIG. 1 is a schematic of a switch assembly;
FIG. 2 is a perspective view of a switch assembly.

DETAILED DESCRIPTION OF THE PREFERRED EMBODIMENT(S)

Figure 3:
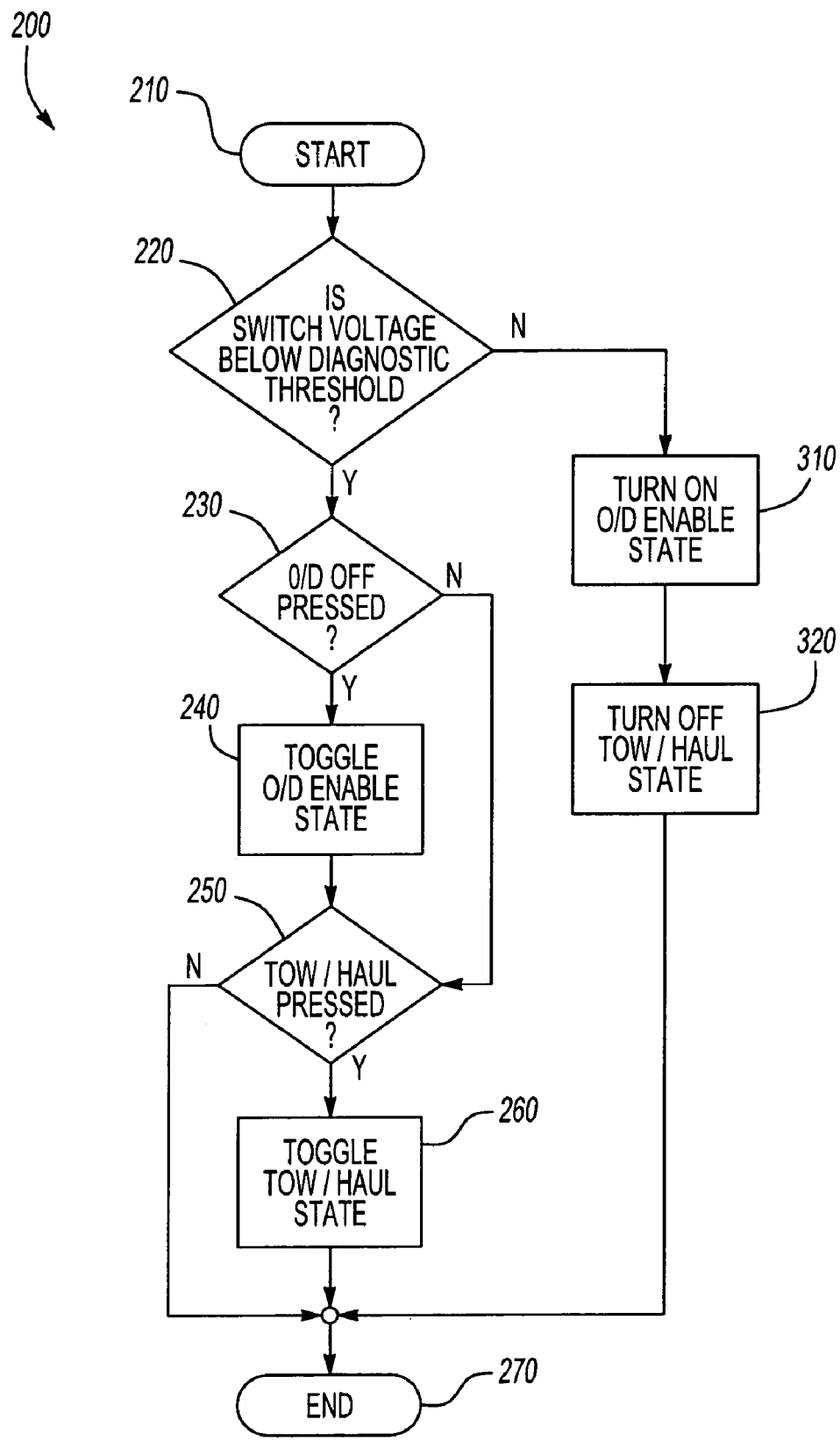
FIG. 3 is a flow diagram illustrating a method of selecting among a plurality of shift schedules.

The following description of the preferred embodiment(s) is merely exemplary in nature and is in no way intended to limit the invention, its application, or uses.

Referring now to FIG. 1, a schematic representation of a switch assembly 10 and associated vehicle components is depicted in accordance with an exemplary embodiment of the present invention. The switch assembly 10 is connected to an engine controller module (ECM) 30 comprised of a microcontroller 22 having a digital to analog converter (A/D) pin. The ECM 30 regulates the inputs and outputs (including fuel, spark, coolant temperature, and throttle position) 34 of the engine 32 as is well known in the art. The ECM 30 communicates with a transmission controller module (TCM) 40 by means of a communication link 24. The TCM has a transmission microcontroller 50 that regulates the inputs and outputs (including shaft speeds and gear select solenoids) 44 of the transmission 42 which includes a transmission output shaft 48 having an output torque, $T_O$, and a transmission input shaft 46 connected to the engine 32 having an input torque, $T_I$, as is well known in the art.

The ECM 30 monitors an output 20 that carries an electrical voltage indicative of whether an operator is pressing either end of a rocker 12. The rocker 12 is used by the operator is indicate whether the overdrive shift schedule should be disabled, or the tow/haul modified shift schedule should be engaged. As shown, switch assembly 10 is an example of such an assembly that is implemented in a resistive-multiplexed (R-mux) configuration. While the R-mux switch is discussed in more detail below, such a switch arrangement is not to be construed as limiting.

R-mux switch assembly 10 is referenced to ground 18 and has an output 20 connected to a microcontroller 22 having an analog-to-digital converter (A/D) pin. The A/D is referenced to voltage (+V) as is known in the art. An operator presses rocker 12 in a first direction which causes switch 14 to close to indicate that engagement of a first shift schedule, such as a tow/haul shift schedule, is desired. Rocker 12 may be pressed in a second direction which causes switch 16 to close, thereby indicating that a second shift schedule, such as one which disables engagement of an overdrive gear ratio, is desired. Both switches 14 and 16 are normally open.

When neither switch 14 nor switch 16 is closed, pin 22 is at a first voltage level that can be expressed as follows:

$$V_{OPEN} = +V^*(R_3/(R_3+R_4)).$$

Pressing rocker 12 in the first direction closes switch 14 and causes a voltage level corresponding to the first shift schedule enable to appear at pin 22. This voltage level can be expressed as:

$$V_{TOW} = +V^*(R_2R_3)/(R_2R_3+R_4).$$

Pressing rocker 12 in the second direction closes switch 16 and causes a voltage level corresponding to the second shift schedule to appear at pin 22. This voltage level can be expressed as:

$$V_{OD} = +V^*(R_1R_3)/(R_1R_3+R_4).$$

Turning now to FIG. 2, a perspective view of a switch assembly 10 is shown. A housing 17 contains the switches 14, 16 and resistors $R_1$, $R_2$ and $R_3$. The rocker 12 is pivotally mounted in the housing 17 such that it may be pressed by the vehicle operator. The rocker 12 may be provided with first and second indicia 13, 15 to facilitate an understanding of the switch operation. The switch assembly 12 is preferably mounted ergonomically such that the vehicle operator may operate the rocker 12 without removing a hand from the steering wheel. Mounting the switch assembly 10 on a stalk extending from the steering column is preferred. Such a mounting arrangement positions the switch assembly 10 behind the steering wheel and within comfortable reach of the operator's fingertips.

The ECM 30 responds to the switch assembly 10 by relaying instructions to the transmission microcontroller 50 housed in the transmission controller module (TCM) 40 regarding the desired engagement status of the transmission's 42 shift schedules in response to operator's use of the momentary rocker switch 12.

In the preferred embodiment of the invention, the control module is accomplished through an engine controller module 30 connected to the transmission controller module 50 by means of a communication link 24. However, it is also known to those skilled in the art that the control module can be accomplished by a powertrain control module.

FIG. 3 shows the method 200 of the invention. In the embodiment depicted in FIG. 1, the ECM 30 is programmed to execute 200, however it may be executed by any electrical module that has access to information regarding the switch states (such as voltages $V_{OPEN}$, $V_{TOW}$, and $V_{OD}$). For example, a body control module may be substituted for the ECM 30. In yet another configuration, the switch may be connected directly to the transmission controller 40, providing the transmission controller 40 has a suitable input, and the transmission controller 40 would then execute the method.

The method is executed periodically, for example every 12 milliseconds. The method starts in decision block 210 and proceeds to decision block 220 where it reads the voltage at the switch output 20. If the voltage at the switch output 20 is below a predetermined diagnostic voltage, which is lower than $V_{OPEN}$, then the method proceeds through blocks 310 and 320 and selects a default shift schedule from the plurality of shift schedules. In the exemplary embodiment, the default shift schedule includes enabling selection of an overdrive gear ratio and deselecting the tow/haul schedule. Returning to block 220, if the voltage at the switch output 20 is above a predetermined diagnostic voltage, then the method proceeds to decision block 230 and determines whether the voltage at the switch output 20 equals $V_{OD}$. If so, then the method then proceeds to block 240 and toggles selection of the overdrive enable shift schedule between overdrive engaged or overdrive disengaged. Returning to decision block 230, if the voltage at the switch output 20 is not equal to $V_{OD}$, the method then proceeds to decision block 250. At decision block 250, the method whether the voltage at the switch output 20 is equal to $V_{TOW}$. If not, then the method proceeds to block 270 and terminates until the next execution. Returning to decision block 250, if the voltage at the switch output 20 is determined to be equal to $V_{TOW}$, the method proceeds to block 260 and toggles selection of the tow/haul shift schedule between engagement and disengagement.

Returning now to decision block 250, in an alternate embodiment, the method may sequence instead through blocks 310 and 320 if the voltage at the switch output 20 is determined to be unequal to $V_{TOW}$. This allows the method to select the default shift schedule when the method is unable to determine, from the voltage at the switch output 20, which switch is closed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrical switch assembly for an electronically controlled transmission having a transmission controller arranged to provide a plurality of shift schedules for the transmission, the switch assembly providing an input signal to the transmission controller for selecting among the plurality of shift schedules, the switch assembly comprising:
   a housing:
   a first set of electrical contacts positioned within said housing, said first set of electrical contacts being selectively closeable by operation of an input member to cause the input signal to be indicative of a selection of a first shift schedule; and
   a second set of electrical contacts positioned within said housing, said second set of electrical contacts being selectively closeable by operation of the input member to cause the input signal to be indicative of a selection of a second shift schedule;
   wherein the input member comprises a rocker positioned in said housing, a first end of said rocker effecting closure of said first set of electrical contacts and a second end of said rocker effecting closure of said second set of electrical contacts.

2. The switch assembly of claim 1 wherein said first shift schedule is an overdrive disengaged mode.

3. The switch assembly of claim 1 wherein said second shift schedule is a tow/haul mode.

4. The switch assembly of claim 1 wherein the shift selections are achieved by toggling between engagement and disengagement of the selected schedules.

5. An electrical switch assembly for an electronically controlled transmission having a transmission controller arranged to provide a plurality of shift schedules for the transmission, the switch assembly providing an input signal to the transmission controller for selecting among the plurality of shift schedules, the switch assembly comprising:
   a housing:
   a first set of electrical contacts positioned within said housing, said first set of electrical contacts being selectively closeable by operation of an input member to cause the input signal to be indicative of a selection of a first shift schedule;
   a second set of electrical contacts positioned within said housing, said second set of electrical contacts being selectively closeable by operation of the input member to cause the input signal to be indicative of a selection of a second shift schedule; and
   a resistively multiplexed switch having one end of a first resistor connected in series with said first set of electrical contacts; one end of a second resistor connected in series with said second set of electrical contacts; and opposite ends of said first and second resistors being connected and producing the input signal.

6. The switch assembly of claim 5 further comprising a diagnostic resister in series with said connection between said opposite ends of said first and second resistors and an electric terminal.

7. The switch assembly of claim 5 wherein said first shift schedule is an overdrive disengaged mode.

8. The switch assembly of claim 5 wherein said second shift schedule is a tow/haul mode.

9. The switch assembly of claim 5 wherein the shift selections are achieved by toggling between engagement and disengagement of the selected schedules.

* * * * *